(12) United States Patent
Estruga Ortiga et al.

(10) Patent No.: US 12,163,072 B2
(45) Date of Patent: Dec. 10, 2024

(54) ELECTRICALLY CONDUCTIVE ADHESIVE FOR ATTACHING SOLAR CELLS

(71) Applicant: Henkel AG & Co. KGaA, Duesseldorf (DE)

(72) Inventors: Marc Estruga Ortiga, Limburg (BE); Liesbeth Theunissen, Wilsele (BE); Anja Henckens, Zonhoven (BE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/080,644

(22) Filed: Oct. 26, 2020

(65) Prior Publication Data

US 2021/0139750 A1    May 13, 2021

Related U.S. Application Data

(63) Continuation of application No. PCT/EP2018/060765, filed on Apr. 25, 2018.

(51) Int. Cl.
| | | |
|---|---|---|
| *H01L 31/042* | (2014.01) |
| *C09J 4/06* | (2006.01) |
| *C09J 9/02* | (2006.01) |
| *C09J 175/14* | (2006.01) |
| *H02S 10/00* | (2014.01) |

(Continued)

(52) U.S. Cl.
CPC . *C09J 9/02* (2013.01); *C09J 4/06* (2013.01); *C09J 175/14* (2013.01); *H02S 20/25* (2014.12); *H02S 40/36* (2014.12); *C09J 2203/322* (2013.01)

(58) Field of Classification Search
None
See application file for complete search history.

(56) References Cited

U.S. PATENT DOCUMENTS

| | | | |
|---|---|---|---|
| 4,999,136 A | 3/1991 | Su et al. | |
| 5,395,876 A * | 3/1995 | Frentzel | C08K 3/08 |
| | | | 252/514 |

(Continued)

FOREIGN PATENT DOCUMENTS

| | | | | |
|---|---|---|---|---|
| CN | 1232969 C | * | 12/2005 | C09D 4/00 |
| CN | 101178948 | | 5/2008 | |

(Continued)

OTHER PUBLICATIONS

WO 0141157 English Machine Translation, accessed Dec. 18, 2021 (Year: 2001).*

(Continued)

*Primary Examiner* — Angelo Trivisonno
(74) *Attorney, Agent, or Firm* — Steven C. Bauman

(57) ABSTRACT

The present invention relates to an electrically conductive composition comprising a) a resin selected from the group consisting of epoxy (meth)acrylate, (poly)ester (meth)acrylate, urethane (meth)acrylate, silicone (meth)acrylate, poly (iso)butylene (meth)acrylate, (poly)isoprene (meth)acrylate, polybutylene (meth)acrylate and mixtures thereof; b) an acrylic monomer; c) an electrically conductive filler; and d) a curing agent. The composition is particularly suitable for use in a solar cell and/or a photovoltaic module, especially in the photovoltaic module, wherein the solar cells are shingled.

13 Claims, 3 Drawing Sheets

(51) Int. Cl.
*H02S 20/25* (2014.01)
*H02S 40/36* (2014.01)

(56) References Cited

U.S. PATENT DOCUMENTS

| | | |
|---|---|---|
| 8,617,427 B2 | 12/2013 | Jiang et al. |
| 10,113,079 B2 | 10/2018 | Lee et al. |
| 2008/0099733 A1 | 5/2008 | Kim et al. |
| 2008/0166543 A1* | 7/2008 | Zhuo ................... C09J 9/02 428/323 |
| 2012/0231248 A1 | 9/2012 | Sato et al. |
| 2014/0124013 A1 | 5/2014 | Morad et al. |
| 2015/0107659 A1 | 4/2015 | Jiang et al. |

FOREIGN PATENT DOCUMENTS

| | | | |
|---|---|---|---|
| CN | 102203164 | 9/2011 | |
| CN | 104250523 | 12/2014 | |
| CN | 104919597 | 9/2015 | |
| CN | 106411243 | 2/2017 | |
| JP | H7508555 | 9/1995 | |
| JP | H11269452 | 10/1995 | |
| JP | 201132335 | 2/2011 | |
| JP | 2014170794 | 9/2014 | |
| JP | 2015228457 | 12/2015 | |
| JP | 2016029134 | 3/2016 | |
| KR | 100787740 | 12/2007 | |
| TW | 201126547 | 8/2011 | |
| TW | 201602272 | 1/2016 | |
| WO | WO-8300409 A1 * | 2/1983 | .......... H01L 31/056 |
| WO | 0062586 | 10/2000 | |
| WO | WO-0141157 A1 * | 6/2001 | .............. H01R 4/04 |
| WO | 2010048387 | 4/2010 | |
| WO | 2017090759 | 6/2017 | |

OTHER PUBLICATIONS

English machine translation of CN-1232969-C (Year: 2023).*
International Search Report issued in connection with International Application No. PCT/EP2018/060765 dated Jan. 11, 2019.

* cited by examiner

US 12,163,072 B2

ELECTRICALLY CONDUCTIVE ADHESIVE FOR ATTACHING SOLAR CELLS

TECHNICAL FIELD

The present invention relates to an electrically conductive adhesive for attaching solar cells together in a shingled photovoltaic module, wherein the adhesive has the required electrical and mechanical properties.

BACKGROUND

A solar cell or photovoltaic cell is an electrical device that converts the energy of light directly into electricity by the photovoltaic effect. Solar cells are the building blocks of the photovoltaic modules, otherwise known as solar panels, in order to increase the voltage delivered by individual solar cells.

Figure 1:
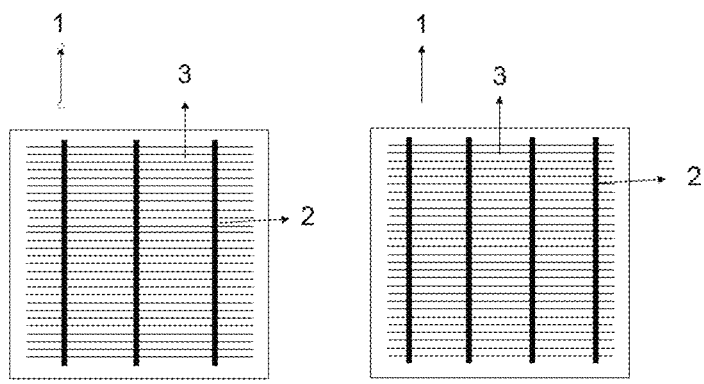
Figure 2:
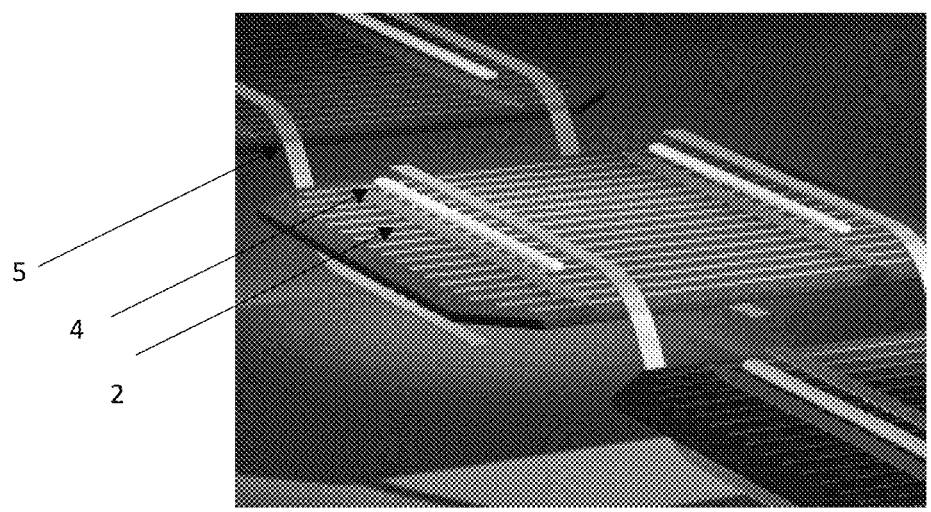

The general structure of a solar cell is illustrated in FIG. 1. Most of the solar cells (1) produced today consist of crystalline silicon. Metal contacts, busbars (2) and fingers (3), are both printed on the silicon wafer. These metallic contacts are necessary to collect the current generated by a solar cell. FIG. 1a illustrates basic configuration with three busbars and FIG. 1b illustrates basic configuration with four busbars. Fingers are linear areas of metallization that collect current to deliver it to the busbars, which are connected directly to the external leads, via ribbons (5) for example. A conventional solar cell, including ribbons (5) is illustrated in FIG. 2. In a conventional photovoltaic module, a high temperature firing pastes are used as finger and busbar material, and the ribbons (5) are attached by means of a soldering process. In addition to soldering, electrically conductive adhesives (4) can be used to bond heat sensitive heterojunction crystalline cells (with a-Si layer present). The ribbons are on top of the bus bars in the conventional photovoltaic module and cause a shadow area to the solar cell leading to decrease the efficiency of the photovoltaic module.

Figure 3:
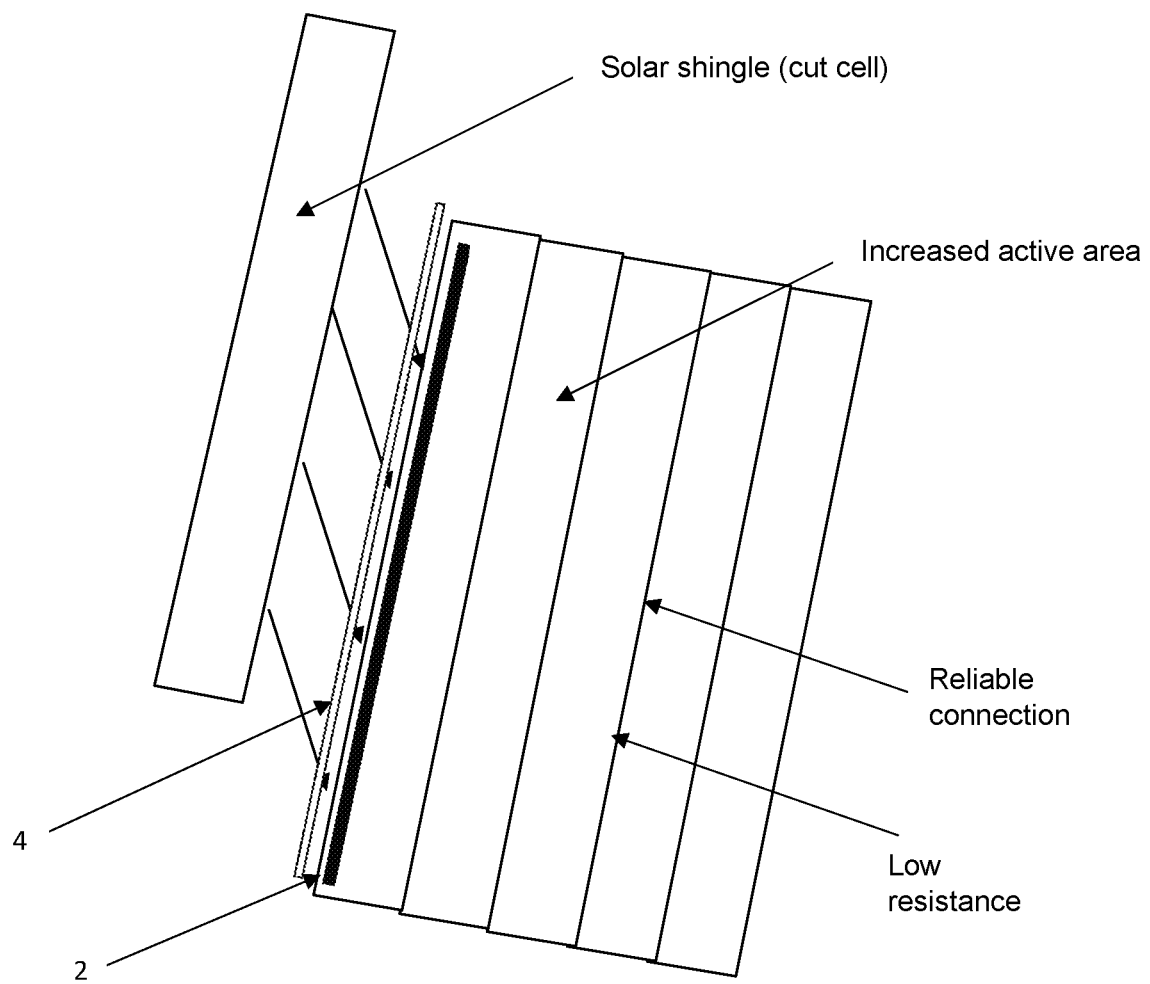

In order to increase the power output of the conventional photovoltaic modules, solar cells can be arranged in series-connected in an overlapping shingle pattern. Shingles are typically made by cutting/dicing crystalline silicon cells along a plurality of lines parallel to a long edge of each wafer to form a plurality of rectangular silicon solar cells each having substantially the same length along its long axis. In this way more shingles (typically 5 or 6 for a six-inch wafer (approx. 156 mm)) are cut/diced from the originally printed cell. The cells can be full square as well as pseudo-square, in the latter cut-cells with chamfered corners may be obtained. The first and second silicon solar cells are bonded to each other at the overlapping portions of the solar cells with an electrically conductive material (4) in shingle structure. The conductive material can be deposited in different patterns. Electrically conductive adhesive as a material to bond the solar cells together have the advantage that they overcome mechanical stresses, which build up due to CTE (coefficient of thermal expansion) mismatch between the different materials used in a photovoltaic assembly. FIG. 3 illustrates a shingled photovoltaic module.

Prior art describes various different kind of electrically conductive adhesives, which can be used in solar cells and to form photovoltaic modules. Many of these electrically conductive adhesives are epoxy or silicone based adhesives. However, a long curing time is often required for some adhesives described in the prior art before the adhesive reaches its full mechanical and electrical properties.

The photovoltaic modules are subjected to a temperature changes and high mechanical stresses over their life cycle. These factors have a negative effect on the lifetime of the photovoltaic module, and also set requirements for the electrically conductive adhesive used in the solar cells and/or photovoltaic cells.

One other limitation described in prior art is that the adhesives may not have the required thermo-mechanical properties. Required thermal-elastic properties for the electrically conductive adhesive composition are correct modulus, specified glass transition temperature, and specified coefficient of thermal expansion in order to pass the thermo-mechanical load reliability test designed for the photovoltaic modules. If the adhesive material is too rigid (too high modulus) the power output loss of the photovoltaic module may occur when applying external stresses to the module (eg. after application of mechanical load or after thermal cycling).

Therefore, there is still a need for an electrically conductive adhesive composition, which has improved long-term bonding strength (long-term adhesion), in particular, if such components and/or substrates will undergo temperature changes during their life-cycle. Furthermore, there is also a need for low cost electrically conductive adhesive composition, which provides the above-mentioned properties.

SHORT DESCRIPTION OF THE FIGURES

Figure 4:
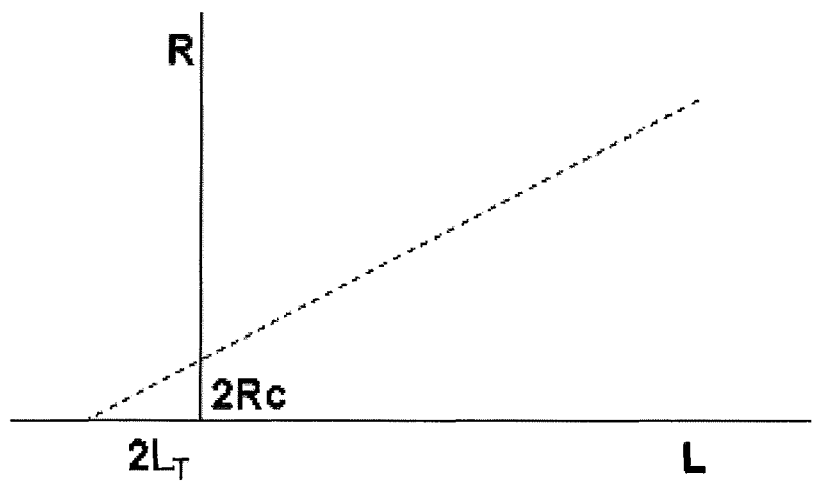

FIG. 1 illustrates a structure of ordinary silicon solar cells.
FIG. 2 illustrates a conventional photovoltaic module.
FIG. 3 illustrates a shingled photovoltaic module.
FIG. 4 illustrates a plot of resistance measured as a function of distance, as described in paragraph [0107].

SUMMARY OF THE INVENTION

The present invention relates to an electrically conductive composition comprising a) a resin selected from the group consisting of epoxy (meth)acrylate, (poly)ester (meth)acrylate, urethane (meth)acrylate, silicone (meth)acrylate, poly(iso)butylene (meth)acrylate, (poly)isoprene (meth)acrylate, polybutylene (meth)acrylate and mixtures thereof; b) an acrylic monomer; c) an electrically conductive filler; and d) a curing agent.

The present invention also encompasses a cured product of the electrically conductive composition according to the present invention.

The present invention also relates to use of the electrically conductive composition according to the present invention or use of the cured product according to the present invention in a solar cell and/or a photovoltaic module.

The present invention also relates to a photovoltaic module, comprising a series-connected string of two or more photovoltaic cells in a shingle pattern having an electrically conductive bonding between said two or more solar photovoltaic cells, wherein said electrically conductive bonding is formed with an electrically conductive composition according to the present invention.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

All percentages, parts, proportions and then like mentioned herein are based on weight unless otherwise indicated.

When an amount, a concentration or other values or parameters is/are expressed in form of a range, a preferable range, or a preferable upper limit value and a preferable lower limit value, it should be understood as that any ranges obtained by combining any upper limit or preferable value with any lower limit or preferable value are specifically disclosed, without considering whether the obtained ranges are clearly mentioned in the context.

All references cited in the present specification are hereby incorporated by reference in their entirety.

Unless otherwise defined, all terms used in disclosing the invention, including technical and scientific terms, have the meaning as commonly understood by one of the ordinary skill in the art to which this invention belongs to. By means of further guidance, term definitions are included to better appreciate the teaching of the present invention.

In the following text the term (meth)acrylate covers both acrylate and methacrylate.

The present invention relates to an electrically conductive composition comprising a) a resin selected from the group consisting of epoxy (meth)acrylate, (poly)ester (meth)acrylate, urethane (meth)acrylate, silicone (meth)acrylate, poly(iso)butylene (meth)acrylate, (poly)isoprene (meth)acrylate, polybutylene (meth)acrylate and mixtures thereof; b) an acrylic monomer; c) an electrically conductive filler; and d) a curing agent.

Surprisingly, the Applicant has discovered that the electrically conductive composition according to the present invention provides fast curing, stress release, long term bonding strength to metal part of the silicon solar cells, reliable connection and low electrical contact resistance to the metal parts of the solar cell despite of low to medium silver quantity. Some of these aspects are illustrated in FIG. 3.

The electrically conductive composition according to the present invention comprises a resin selected from the group consisting of epoxy (meth)acrylate, (poly)ester (meth)acrylate, urethane (meth)acrylate, silicone (meth)acrylate, poly(iso)butylene (meth)acrylate, (poly)isoprene (meth)acrylate, polybutylene (meth)acrylate and mixtures thereof.

Above listed thermoset acrylate resins have the advantage that they can vary between very rigid to very flexible materials. Furthermore, a resin having a low Tg value is preferred, this is because resin having a low Tg value provides a desired flexibility to the composition in order to pass the solar module reliability testing.

Preferably, the resin used in the present invention has a Tg value 15° C. or less.

However, the adhesive cannot be too flexible, because stable electrical contacts to a solar cell are difficult to maintain. Therefore, the formed contacts need to be flexible enough but having some rigidity to provide stability to the structure. Furthermore, it is known that the contact resistance of the adhesive to the solar cell tends to increase during thermocycling between −40° C. and 85° C. and/or during ageing at 85° C. in high humidity environments (85% humidity). This is causing power output of modules to decrease during these reliability conditions. Therefore, it is important to provide adhesive having desired flexibility.

Preferably, the resin is a (poly)(iso)butylene (meth)acrylate, a (poly)isoprene (meth)acrylate or an urethane (meth)acrylate, more preferably an aliphatic or aromatic urethane (meth)acrylate or an aliphatic polyester based urethane di(meth)acrylate oligomer, more preferably an aliphatic urethane (meth)acrylate or an aliphatic polyester based urethane di(meth)acrylate oligomer or a mixture thereof.

Urethane acrylates, and especially aliphatic urethane di(meth)acrylates are preferred because they have low Tg value, and they can provide the desired flexibility to the composition.

Suitable commercially available resins for use in the present invention include, but are not limited to Ebecryl 8232, Ebecryl 230, Ebecryl 4744, Ebecryl 3639, Ebecryl 3708 from Allnex; Genomer 2253, Genomer 3457, Genomer 4215 and Genomer 4230 from Rahn; and CN9002, CN9021, CN9014, SR 307, CN 307 from Arkema; EPION 400V from Kaneka and UC-102, UC-102M, UC-203 and UC-203M from Kuraray.

An electrically conductive composition according to the present invention comprises a resin from 10 to 65% by weight of the total weight of the composition, preferably from 10 to 55%, more preferably from 11 to 45% and even more preferably from 12 to 35%.

If the quantity of the resin is too high, the resulting composition results in a very low filled formulation regarding electrically conductive filler, and conductivity properties are negatively affected. On the other hand, too low resin quantity does not provide a required adhesion strength.

The electrically conductive composition according to the present invention comprises an acrylic monomer, which is and acts as a reactive diluent. Suitable acrylic monomer for use in the present invention may be a mixture of one type of acrylic monomers or a mixture of different kind of acrylic monomers.

In one embodiment the acrylic monomer is at least one (meth)acrylate monomer having two or more (meth)acrylate groups.

Alternatively, in another embodiment the acrylic monomer is a mixture of at least one (meth)acrylate monomer having two or more (meth)acrylate groups and a (meth)acrylate functionalized phosphate ester.

Alternatively, yet in another embodiment the acrylic monomer is a mixture of at least one (meth)acrylate monomer having two or more (meth)acrylate groups and at least one (meth)acrylate monomer having one (meth)acrylate group and a (meth)acrylate functionalized phosphate ester.

The above listed combinations of acrylic monomers are preferred because the presence of functionalized phosphate ester acrylic monomer promotes the adhesion, and the presence of two or more acrylic groups promotes ideal cure shrinkage, and therefore, provides low resistance.

Suitable (meth)acrylate monomer having one (meth)acrylate group for use in the present invention is preferably selected from the group consisting of isobornyl acrylate, isobornyl methacrylate, 2-(2-ethoxyethoxy) ethylacrylate, lauryl acrylate, lauryl methacrylate, acrylic acid ester, cyclic trimethylolpropane formal acrylate, 4-tert-butylcyclohexylacrylate, 2-phenoxyethylacylate, 2-phenoxyethylmethacrylate, tetrahydrofurfuryl acrylate, 3,3,5-trimethylcyclohexyl acrylate and mixtures thereof.

These monofunctional (meth)acrylate monomers are preferred because they have good diluting properties and good compatibility with the composition according to the present invention. Particularly, isobornyl methacrylate is preferred because it has ideal diluting properties for the composition according to the present invention.

Suitable commercially available (meth)acrylate monomers having one (meth)acrylate group for use in the present invention include, but are not limited to SR256, SR489, SR395, SR440, SR335, SR285, SR423D, SR550 from Arkema; Miramer M170, M1084 from Miwon Specialty Chemical Co., Ltd., IBXA from Osaka Organic Chemical Ind.; Genomer 121, Genomer 121M from Rahn; and IBOA from Osaka Organic Chemical ltd.

Suitable (meth)acrylate monomer having two or more (meth)acrylate groups for use in the present invention is preferably selected from the group consisting of 1,6-hexanediol diacrylate, trimethyl propane triacrylate, trimethylol propane (EO)$_3$ triacrylate, trimethylol propane (EO)$_9$ triacrylate, pentaerythritol triacrylate, di-trimethylolpropane triacrylate, ethoxylated pentaerythritol tetraacrylate, neopentyl glycolpropoxylate diacrylate, polyethylene glycol 400 diacrylate, tetra(ethylene glycol) diacrylate, tripropyleneglycol diacrylate, hydroxyl pivalic neopentyl glycol diacrylate, tricyclodecane dimethanol diacrylate and mixtures thereof.

These multifunctional (meth)acrylate monomers are preferred because they have good diluting properties and good compatibility with the composition according to the present invention.

Suitable commercially available (meth)acrylate monomers having two or more (meth)acrylate groups for use in the present invention include, but are not limited to SR238, SR833S, SR834, SR355, SR 285, SR 248, SR 259, SR 9003 and SR494 from Arkema; and Miramer M202, M220, M222, M232 from Miwon Specialty Chemical Co. Ltd.

A (meth)acrylate functionalised phosphate ester can be used in the present invention as an acrylic monomer. Suitable phosphate ester of (meth)acrylate may have the following general structure

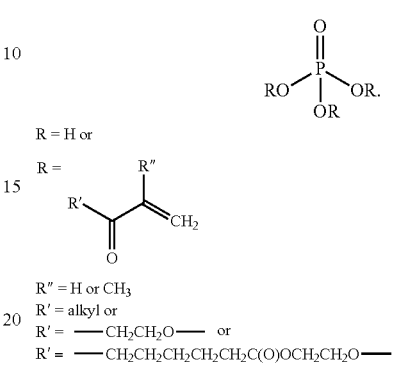

Specific non-limiting examples of phosphate esters of (meth)acrylate suitable for use in the present Invention are:

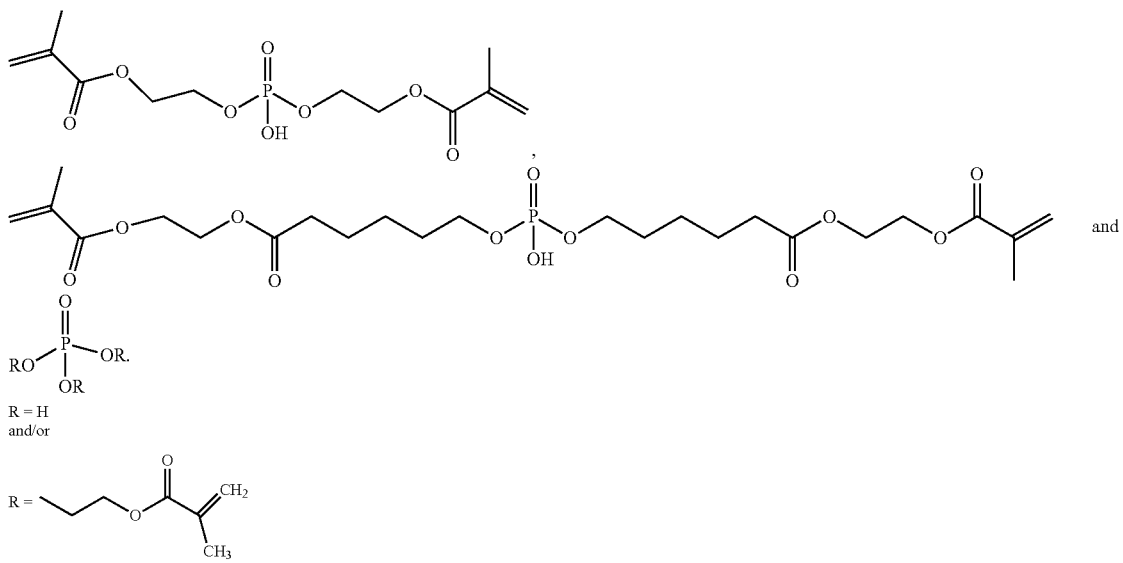

Suitable phosphate ester of (meth)acrylate for use in the present invention is phosphoric acid 2-hydroxy ethyl methacrylate. Phosphoric acid 2-hydroxy ethyl methacrylate is particularly preferred because of its diluting properties, and in addition it provides good adhesion properties.

Suitable commercially available phosphate ester of (meth)acrylates for use in the present invention include, but are not limited to Ebecryl 168, Ebecryl 170, Ebecryl 171 from Allnex; Kayamer PM-2, Kayamer PM-21 from Nippon Kayaku co. Ltd; Genorad 40 from Rahn; SR9050, SR9051, SR9054 from Arkema; and PAM100, PAM200 from Rodia.

In one embodiment, an acrylic monomer is at least one (meth)acrylate monomer having two or more (meth)acrylate groups selected from the group consisting of 1,6-hexanediol diacrylate, trimethyl propane triacrylate, trimethylol propane (EO)$_3$ triacrylate, trimethylol propane (EO)$_9$ triacrylate, pentaerythritol triacrylate, di-trimethylolpropane triacrylate, ethoxylated pentaerythritol tetraacrylate, neopentyl glycolpropoxylate diacrylate, polyethylene glycol 400 diacrylate, tetra(ethylene glycol) diacrylate, trlpropyleneglycol diacrylate, hydroxyl pivalic neopentyl glycol diacrylate, tricyclodecane dimethanol diacrylate and mixtures thereof.

In another embodiment, an acrylic monomer is a mixture of at least one (meth)acrylate monomer having two or more (meth)acrylate groups selected from the group consisting of 1,6-hexanediol diacrylate, trimethyl propane triacrylate, trimethylol propane (EO)₃ triacrylate, trimethylol propane (EO)₉ triacrylate, pentaerythritol triacrylate, di-trimethylolpropane triacrylate, ethoxylated pentaerythritol tetraacrylate, neopentyl glycolpropoxylate diacrylate, polyethylene glycol 400 diacrylate, tetra(ethylene glycol) diacrylate, tripropyleneglycol diacrylate, hydroxyl pivalic neopentyl glycol diacrylate, tricyclodecane dimethanol diacrylate and mixtures thereof, and a (meth)acrylate functionalized phosphate ester selected from

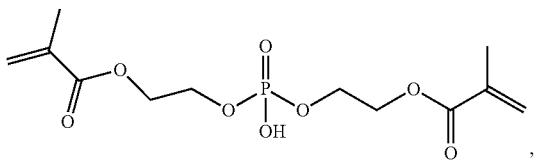

,

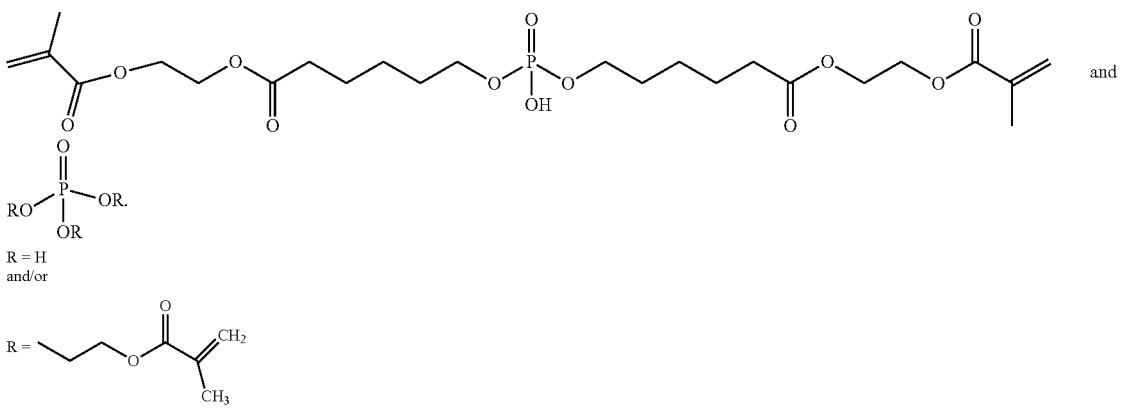

and

R = H
and/or

In another embodiment, an acrylic monomer is a mixture of at least one (meth)acrylate monomer having two or more (meth)acrylate groups selected from the group consisting of 1,6-hexanediol diacrylate, trimethyl propane triacrylate, trimethylol propane (EO)₃ triacrylate, trimethylol propane (EO)₉ triacrylate, pentaerythritol triacrylate, di-trimethylolpropane triacrylate, ethoxylated pentaerythritol tetraacrylate, neopentyl glycolpropoxylate diacrylate, polyethylene glycol 400 diacrylate, tetra(ethylene glycol) diacrylate, tripropyleneglycol diacrylate, hydroxyl pivalic neopentyl glycol diacrylate, tricyclodecane dimethanol diacrylate and mixtures thereof and at least one (meth)acrylate monomer having one (meth)acrylate group selected from the group consisting of isobornyl acrylate, isobornyl methacrylate, 2-(2-ethoxyethoxy) ethylacrylate, lauryl acrylate, lauryl methacrylate, acrylic acid ester, cyclic trimethylolpropane formal acrylate, 4-tert-butylcyclohexylacrylate, 2-phenoxyethylacylate, 2-phenoxyethylmethacrylate, tetrahydrofurfuryl acrylate, 3,3,5-trimethylcyclohexyl acrylate and mixtures thereof and a (meth)acrylate functionalized phosphate ester selected from

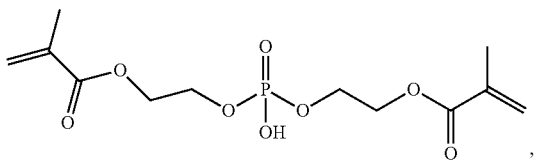

,

-continued

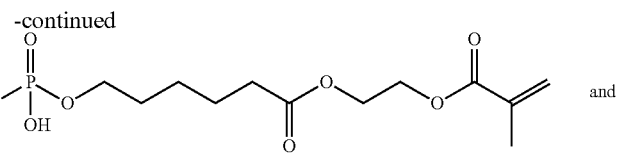

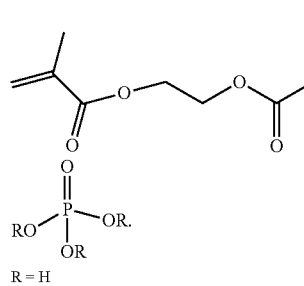

R = H
and/or

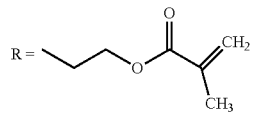

An electrically conductive composition according to the present invention comprises an acrylic monomer from 1 to 65% by weight of the total weight of the composition, preferably from 5 to 60%, more preferably from 10 to 55% and even more preferably from 15 to 50%.

If the quantity of the acrylic monomer is less than 1% there is no physical effect to the composition. On the other hand, if the quantity exceeds 65% the composition will be adversely affected: there will be out gassing, bleeding, no cross-linking (more homopolymerisation takes a place) and therefore, the structure is not building up, and furthermore, the viscosity of the composition will not be ideal.

The electrically conductive composition according to the present invention comprises an electrically conductive filler.

Suitable electrically conductive filler for use in the present invention can exist in a variety of shapes, e.g., as substantially spherical particles, as irregular shaped particles, oblong particles, flakes (e.g., thin, flat, single crystal flakes), and the like. The electrically conductive filler may be for example a mixture of spherical particles and flake particles.

Suitable electrically conductive filler for use in the present invention have preferably an average particle size in the range of from 300 nm to 50 micron, preferably from 500 nm to 40 micron and more preferable from 500 nm to 30 micron.

The particle size is measured by particle size analyser and the particle shape is analysed by scanning electron microscope. In short scattered laser lights from the particles are detected an array of detectors. Theoretical calculation is carried out to fit the measured distribution of scattered light intensity. During the fitting process the particle size distribution is deduced and D10, D50, D90 etc. values are calculated accordingly.

Suitable electrically conductive filler for use in the present invention may be a mixture of particles having a small particle size and particles having a larger particle size.

Suitable electrically conductive filler is selected from the group consisting of silver, nickel, carbon, carbon black, graphite, graphene, copper, gold, platinum, aluminium, iron, zinc, cobalt, lead, tin alloys, silver coated copper, silver coated graphite, silver coated polymers, silver coated aluminium, silver coated glass, silver coated carbon, silver coated boron nitride, silver coated aluminium oxide, silver coated aluminium hydroxide and mixtures thereof.

Silver coated polymers may be acrylic polymers and/or silicone based polymers.

Preferably electrically conductive filler is selected from the group consisting of silver, carbon black, graphite, graphene, copper, silver coated copper, silver coated graphite, silver coated polymers, silver coated aluminium, silver coated glass, silver coated carbon, silver coated boron nitride, silver coated aluminium oxide, silver coated aluminium hydroxide and mixtures thereof, more preferably electrically conductive filler is selected from the group consisting of silver, silver coated copper, silver coated graphite, silver coated polymers, silver coated aluminium, silver coated glass and mixtures thereof.

Silver is preferred because it's good electrical performance. Silver coated fillers are preferred because of their lower cost (compared to silver). Furthermore, these preferred electrically conductive fillers do not have pot life issues when used in free radical cure acrylic formulations.

Suitable commercially available electrically conductive fillers for use in the present invention include, but are not limited to silver: AA3462, AA-5124, AA-192N, C-1284P, C-0083P, P543-14 from Metalor; KP84, KP74, KP29 from Ames Goldsmidth; silver coated copper: CGF-DAB-121B from Dowa; AgCu0810 or AgCu0305 from Ames Goldsmidth; silver coated glass: CONDUCT-O-FIL™ SG15F35 from Potters Industries Inc.; silver coated polymer: Sphericam 30.22 from Mosaic Solutions; silver coated graphite: P594-5 from Metalor; silver coated Al: CONDUCT-O-FIL™ SA325S20 from Potters Industries Inc.

An electrically conductive composition according to present invention comprises an electrically conductive filler from 10 to 70% by weight of the total weight of the composition, preferably from 20 to 65% and more preferably from 30 to 60%.

If the quantity of the electrically conductive filler is below 10%, the composition does not provide required electrical conductivity. On the other hand, if the quantity of the electrically conductive filler is above 70%, the composition is no longer cost effective. Furthermore, generally lower electrically conductive filler quantity decreases the overall weight of the solar cell/photovoltaic module and reduces the overall costs.

The Applicant has found out that the flexibility of the adhesive can be modified even further by reducing the quantity of the electrically conductive fillers and to increase the quantity of the resin matrix. The composition according to the present invention is able to overcome the accumulated mechanical stresses in the photovoltaic modules.

Furthermore, the combination of low to mid-range quantity of the electrically conductive fillers, resin and acrylic monomer mixture as described in the present invention have a key role to lead good electrical properties and good adhesion properties, in addition to good application properties. At the same time low to mid-range quantity of the electrically conductive fillers reduces the overall costs.

Suitable electrically conductive fillers for use in the present invention include also silver coated/plated particulate, wherein the underlying particulate can be a wide variety of materials, as long as the silver coating/plating substantially coats the underlying particulate, such that the resulting composition comprises silver-covered particles distributed throughout.

In an event the electrically conductive filler is a silver coated particle, the silver quantity is from 10 to 70% by weight of the total weight of the electrically conductive filler, preferably from 10 to 65% and more preferably from 10 to 60%.

Preferably, electrically conductive filler has a tap density from 0.7 g/cm$^3$ to 6.0 g/cm$^3$, preferably from 1.0 g/cm$^3$ to 5.5 g/cm$^3$, more preferably from 1.0 g/cm$^3$ to 4.0 g/cm$^3$.

The tap density is determined in accordance to ISO 3953 typically using a 25 cm$^3$ graduated glass cylinder. The principle of the method specified is tapping a specified amount of powder in a container by means of a tapping apparatus until no further decrease in the volume of the powder takes place. The mass of the powder divided by its volume after the test gives its tap density.

The Applicant has surprisingly found out that the combination of aliphatic urethane di(meth)acrylate, acrylic monomer mixture and low to mid-range electrically conductive filler quantity works well together to provide low electrical contact resistance to metal parts of silicon solar cell, stress release, long term bonding strength to metal part of silicon solar cells and fast curing.

The electrically conductive composition according to the present invention comprises a curing agent.

Any conventional curing agent suitable for (meth)acrylate resins can be used in the present invention. Examples of suitable curing agents for use in the present invention are peroxides and azo compounds. Preferably, the curing agent used in the present invention is a peroxide.

Suitable peroxide for use in the present invention is selected from the group consisting of tert-butyl peroxy 2-ethylhexanoate, di-tert-butyl peroxide, tert-butyl peroxybenzoate, tert-butyl peroxyneodecanoate, 2,5-dimethyl-2,5 (tert-butyl peroxy) hexane, dicumyl peroxide, tert-amyl-peroxyneodecanoate di(4-tert-butylcyclohexyl) peroxydicarbonate, di-sec-butyl peroxydicarbonate, diisopropyl peroxydicarbonate, di(2-ethylhexyl)peroxydicarbonate, dicetyl peroxydicarbonate, dimyristyl peroxydicarbonate) and mixtures thereof.

Tert-butyl peroxyneodecanoate is one preferred peroxide because it has good compatibility with the composition and it provides ideal fast curing speed.

Suitable commercially available peroxides for use in the present invention include, but are not limited to Luperox 10, Luperox 26, Luperox DI, Luperox P and dicumyl peroxide from Arkema; and Trigonox 101 from AzkoNobel.

An electrically conductive composition according to the present invention comprises a peroxide from 0.1 to 3% by weight of the total weight of the composition, preferably from 0.2 to 2%.

An electrically conductive composition according to the present invention may further comprise an adhesion promoter.

Suitable adhesion promoter for use in the present invention is selected from the group consisting of epoxy functional silanes, (meth)acrylic functional silanes, carboxylates and mixtures thereof.

Suitable commercially available adhesion promotors for use in the present invention include, but are not limited to Silquest A-187, Silquest A-1100, Silquest A-1106, Silquest A-1110, Silquest A1120, Silquest A1130, Silquest A-1170, Silquest A2120, Silquest A-174 (acrylic functional silane) and Silquest A-186 from Momentive; and BYK 4509, 4510, 4511, 4512 from Altana.

An electrically conductive composition according to the present invention may comprise an adhesion promoter from 0.01 to 10% by weight of the total weight of the composition, preferably from 0.05 to 5% and more preferably from 0.1 to 3.5%.

If the quantity of an adhesion promoter exceeds 10% other properties of the composition will be negatively affected, leading to decreased adhesion strength and decreased electrical conductivity.

An electrically conductive composition according to the present invention may further comprise rheological additives such as bentone (such as Bentone 27, Bentone 38 and Bentone SD-2 from Elemenits Specialities), silica, fumed silica (such as Aerosil 200, Aerosil 300, Aerosil COK 84, Aerosil R711 and Aerosil R7200 from Evonik), fused silica (such as FB-5SDC, FB-7SDC, and FB-9454 from DENKA) and aluminium oxide (such as AE 9104 from Admatechs Co., LTD and Aeroxide Alu C, Aeroxide Alu 130 and Aeroxide Alu 65 from Evonik).

An electrically conductive composition according to the present invention may further comprise wetting and dispersing agents such as BYK W903 from Altana.

An electrically conductive composition according to the present invention may further comprise rheology additives such as BYK-411, BYK E-411, BYK-430, BYK-430, BYK-431 and BYK-R605 from Altana; and Thixatrol P220X-MF, Thixatrol Plus, and Thixatrol PM 8054 From Elementis.

An electrically conductive composition according to the present invention may further comprise a radical stabilizer such as BHT (butylated hydroxytoluene) or alternative radical stabilizers such as Genorad 16, Genorad 18, Genorad 21 and Genorad 22 from Rahn.

An electrically conductive composition according to the present invention may be applied by using any of the following techniques time pressure dispense, jet dispense, auger dispense, stencil printing and screen printing.

The viscosity of the electrically conductive composition according to the present invention needs to be adjusted to be suitable for the selected application method. Generally, viscosity tolerated for stencil or screen printing may be slightly higher than viscosity needed in dispensing method. Optimizing rheology to make it suitable for the targeted application can be done by slightly increasing/decreasing the quantity of the acrylic monomers or by using small quantities of rheological additives.

If viscosity is too high, (a viscosity at 25° C. above 100 Pa·s or 100,000 cPoise as measured by rheometer at 15s-1), the application of the electrically conductive adhesive in a high speed process will become problematic.

The present invention relates to a cured product of the electrically conductive composition according to the present invention. The composition according to the present invention may be cured thermally.

The electrically conductive adhesive according to the present invention having the required electrical and mechanical properties can be used in a shingled photovoltaic module wherein the crystalline silicon based solar singles are attached to each other by using the electrically conductive adhesive.

The present invention encompasses the use of the electrically conductive composition according to the present invention in a solar cell and/or a photovoltaic module.

The present invention encompasses the use of cured electrically conductive composition according to the present invention in a solar cell and/or a photovoltaic module.

Preferably, the electrically conductive composition according to the present invention is used as an interconnection material in the photovoltaic module, wherein the solar cells are shingled. A shingled structure is illustrated in FIG. 3.

In one embodiment, the electrically conductive composition according to the present invention may be used to bond ribbons to the solar cells as shown in FIG. 2.

The present invention also relates to a photovoltaic module, comprising a series-connected string of two or more solar cells in a shingle pattern having an electrically conductive bonding between said two or more solar cells, wherein said electrically conductive bonding is formed with an electrically conductive composition according to the present invention. Shingle structure is illustrated in FIG. 3.

The electrically conductive composition according to the present invention can be applied by dispensing, jetting or printing to solar cells.

EXAMPLES

The example compositions are prepared by mixing all ingredients together to form a homogenous mixture.

Test Methods:

Viscosity was measured on a Rheometer from TA instruments Rheometer HR-1 or Q-2000 using a plate-plate geometry with a 2 cm in diameter plate at a 200 micron gap and shear rates of 1.5 s-1 or 15 s-1. Viscosity units are reported in Pa·s. Volume resistivity (VR) was measured as follows:

Samples were prepared for the compositions according to the examples above and deposited on a glass plate (by drawing down a strip of material onto the surface of a glass slide with strip dimensions of about 5 cm in length, 5 mm in width and about 50 micron in thickness) and cured and dried (according to the requirement for the used resin). Glass plates were cooled to room temperature, before measurement.

Volume resistivity was calculated from equation VR= (width of the sample (cm)×thickness of the sample (cm)× Resistance (Ohm))/length of the sample (cm). Where the resistance in ohm was measured by using a Keithley 2010 multimeter and a 2 point resistance probe. Volume resistivity units are reported in Ohm·cm Electrical Contact Resistance (CR)

The electrical contact resistance was determined by dispensing the conductive adhesive in a TLM structure on a 1.5 mm wide busbar of a c-Si wafer. A TLM structure was obtained by contacting 7 Ag plated Cu tabs (2 mm wide, 1 micron Ag coating) to the test layer, wherein the contact tabs exhibit increasing distances between the contact tabs going from about 3 mm to about 18 mm. The resistance between the neighbouring contact tabs was measured by using Keithley four-point probes and a Keithley 2750 multimeter and plotted as a function of the distance. The contact resistance value is the half of the intercept from the curve obtained from that plot. The average contact resistance (arithmetic average) is reported in mohm. If no linear relation could be found because of bad ohmic contacts meaning an rsq value of less than 0.9, "no fit" was mentioned.

The stability of the electrical contact resistance was determined by accelerated ageing testing (85° C., relative humidity of 85% and −40, 85° C. thermal cycling) using the TLM test setup as described above.

DSC has been measured by using Dynamic Scanning Calorimetry Q2000 from TA Instruments. The basic principle underlying this technique is that when the sample undergoes a phase transitions, more or less heat will be needed compared to the reference to keep the reference and the sample at the same temperature. Whether less or more heat must flow to the sample depends on whether the process is exothermic or endothermic. Weight of the analysed uncured material in the sample pan is 5 to 20 mg. An open aluminium sample pan is used and sample is subjected to dynamic heating where sample is heated from room temperature to 250° C. at 10° C./min heating rate under continuous nitrogen flow of 50 mL/min. This allows to follow the cure behaviour which is an exothermic reaction. Peak temperature of the exothermic reaction is reported in ° C.

Dynamic mechanical analysis (DMA) is performed to measure the Storage Modulus (E-modulus) value which is the elastic response of material by using TA instruments DMA Q800 or DMA 2980. Storage Modulus units are reported in MPa.

Thin film samples with the following dimensions: width 8-10 mm, length 13-15 mm and thickness 150-200 micron, were measured by using Film Tension clamp. Samples were cured for 15 min at 150 or 180° C.

Power Output of Mini-Modules:

The mini-modules (single-cell modules) were built up out of five shingles. For the single-cell modules, mono crystalline PERC solar cells were used. For bussing the string, a SnPb/Cu ribbon was used. The amount of ECA was 6 mg per shingle. The ECA curing temperature was 150° C. Mini-modules were assembled with glass, EVA and back sheet foil in a laminator at 140° C. for 20 min. The mini-module performance was tested with the Meyer Berger Spotlight cell tester. The power output (Pmax) of the five-shingle module was monitored during reliability. To mimic the effect of outdoor conditions, the mini-modules were cycled between −40° C. and 85° C., according to IEC 61215:2005 standard. The difference between the initial power output (Δ Pmax) of the shingle-cell module and after 600 cycles −40° C./85° C. are shown.

TABLE 1

|  | Ex. 1 | Ex. 2 comparative | Ex.3 comparative |
| --- | --- | --- | --- |
| urethane acrylic oligomer CN9002 | 19.32 | 17.26 | 19.3 |
| monofunctional diluent isobornyl acrylate | 11.15 | 19.92 | 22.30 |
| SR256 (2(2-ethoxyethoxy) ethyl acrylate | 0.874 | 0.78 | 0.874 |
| Phosphoric acid 2-hydroxy ethyl methacrylate | 1.07 | 0.95 | 1.07 |
| multifunctional diluent SR 238 | 11.15 | — | — |
| adhesion promotor Silquest A-187 | 0.41 | 0.36 | 0.41 |
| Peroxide Luperox 10 | 0.82 | 0.73 | 0.82 |
| silver KP84X, K-1322P | 55.22 | 59.97 | 55.22 |
| Sum | 100 | 100 | 100 |
| wt % filler | 55.22% | 60.00% | 55.22% |
| Viscosity in Pa · s 15 s-1 | 13.24 | 22.77 | 16.14 |
| VR in ohm · cm (cure 15 min 150° C. boxoven) | 3.90E−03 | 1.31E−03 | 1.68E−03 |
| Contact resistance in mohm* | 20.5 | 57 | 69.5 |

TABLE 1-continued

|  | Ex. 1 | Ex. 2 comparative | Ex.3 comparative |
|---|---|---|---|
| DMA 15 min at 150° C. boxoven |  |  |  |
| (E modulus at −15° C.) | 2849 | 2236 | 1925 |
| (E modulus at 25° C.) | 1258 | 312 | 272 |

*In the above examples contact resistance (CR) was measured using 1.2 mm wide Ag coated Cu ribbon (instead of 2 mm) and 0.7 mm wide busbar (instead of 1.5 mm).

TABLE 2

|  | Ex. 4 | Ex. 5 | Ex. 6 |
|---|---|---|---|
| Resin UC-102M; EPION 400V | 20.63 | 17.44 | 13.25 |
| monofunctional diluent: isobornyl acrylate, SR335, SR440 | 17.80 | 17.28 | 17.64 |

TABLE 2-continued

|  | Ex. 4 | Ex. 5 | Ex. 6 |
|---|---|---|---|
| Phosphoric acid 2-hydroxy ethyl methacrylate | 2.60 | — | — |
| multifunctional diluent: SR 833S, SR834 | 7.74 | 4.44 | 8.82 |
| Peroxide Luperox 10 | 1.09 | 0.69 | 0.7 |
| silver KP84X, NX4000A, K-1322P | 50.03 | 60.15 | 59.59 |
| Butylated hydroxytoluene (BHT) | 0.1 | — | — |
| wt % filler | 50.03% | 60.15% | 59.59% |
| Viscosity in Pa · s 15 s−1 | 45.16 | 71.1 | 21.8 |
| VR in ohm · cm (cure 15 min 150° C. boxoven) | 5.32E−04 | 4E−04 | 5.7E−04 |
| Contact resistance in mohm* | 17 | 7 | 7.6 |
| DMA 15 min at 150° C. boxoven |  |  |  |
| (E modulus at −15° C.) | 2849 | 446 | 2488 |
| (E modulus at 25° C.) | 1258 | 213 | 1354 |

*In the above examples contact resistance (CR) was measured using 1.2 mm wide Ag coated Cu ribbon (instead of 2 mm) and 0.7 mm wide busbar (instead of 1.5 mm).

TABLE 3

|  | Ex. 7 | Ex. 8 | Ex. 9 comparative | Ex. 10 | Ex. 11 | Ex. 12 |
|---|---|---|---|---|---|---|
| urethane acrylic oligomer | 21.35 | 19.47 | 20.26 | 15.76 | 14.83 | 13.64 |
| Isobornylacrylate | 13.56 | 12.36 | 25.73 | 10.00 | 9.41 | 8.67 |
| SR256 (2-ethoxyethoxy) ethyl acrylate | 3.48 | 3.17 | 3.30 | 2.57 | 2.41 | 1.52 |
| SR238. SR494 multifunctional acrylic monomer | 13.56 | 12.36 | — | 10.00 | 9.41 | 8.67 |
| Butylated hydroxytoluene (BHT) | 0.03 | 0.03 | 0.03 | 0.02 | 0.02 | — |
| Phosphoric acid 2-hydroxy ethyl methacrylate | 1.35 | 1.23 | 1.28 | 1.00 | 0.94 | 1.57 |
| Silquest A-187 adhesion promotor | 0.52 | 0.47 | 0.49 | 0.38 | 0.36 | 0.33 |
| peroxide Luperox 10 | 0.97 | 0.88 | 0.92 | 0.71 | 0.67 | 0.62 |
| Silver P543-14; K1322P; NX4000A; KP84X | 45.19 | 50.03 | 47.99 | 59.55 | 61.95 | 64.99 |
| Sum | 100.0 | 100.0 | 100.0 | 100.0 | 100.0 | 100.0 |
| Viscosity at 15 s−1 in Pa · s | 21.64 | 29.3 | 29.42 | 9.3 | 13.77 | 63.01 |
| Volume resistivity in ohm · cm (Cure: 15 min at 150° C. boxoven) | 1.79E−03 | 1.13E−03 | 7.17E−04 | 6.40E−04 | 5.86E−04 | 2.8E−04 |
| Volume resistivity in ohm · cm (Cure: 35 s, at 150° C. hotplate) | 1.95E−03 | 1.13E−03 | 4.38E−03 | 9.39E−04 | 8.88E−04 | 3.2E−04 |
| Contact resistance in mohm | 24.5 | 21 | 40.5 | 11 | 11.5 | 7.5 |
| Δ Pmax (%) after 600 cycles TC | −1.68 | −1.01 | −3.06 |  |  | 0.16 |
| Peak temperature (° C.) DMA 15 min at 150° C. boxoven | 65.15 | 64.72 | 73.78 | 78.52 | 71.99 | — |
| (E modulus at −15° C.) | 1905 | 441 | 2053 | 1483 | 1921 | 3766 |
| (E modulus at 25° C.) | 531 | 120 | 573 | 435 | 586 | 1641 |

TABLE 4

|  | Ex. 13 comparative | Ex. 14 | Ex. 15 comparative | Ex. 16 comparative | Ex. 17 |
|---|---|---|---|---|---|
| Urethane acrylic resin | 20.28 | 20.28 | 20.28 | 20.28 | 20.28 |
| Isobornylacrylate | 25.75 | 12.88 | — | 12.88 | — |
| SR256 (2(2-ethoxyethoxy) ethyl acrylate mono functional acrylate | 3.30 | 3.30 | 29.05 | 16.18 | 3.30 |
| SR238, SR494 multifunctional acrylic monomer | — | 12.88 | — | — | 25.75 |

TABLE 4-continued

|  | Ex. 13 comparative | Ex. 14 | Ex. 15 comparative | Ex. 16 comparative | Ex. 17 |
|---|---|---|---|---|---|
| Phosphoric acid 2-hydroxy ethyl methacrylate | 1.28 | 1.28 | 1.28 | 1.28 | 1.28 |
| Adhesion promoter Silquest A-187 | 0.49 | 0.49 | 0.49 | 0.49 | 0.49 |
| Peroxide Luperox 10 | 0.92 | 0.92 | 0.92 | 0.92 | 0.92 |
| Silver | 47.98 | 47.98 | 47.98 | 47.98 | 47.98 |
| Sum | 100.00 | 100.00 | 100.00 | 100.00 | 100.00 |
| Viscosity at 15 $s^{-1}$ in Pa · s | 33.2 | 25.2 | 15.5 | 24.2 | 22.9 |
| Volume resistivity in ohm · cm after cure for 5 min at 180° C. boxoven | 2.66E−03 | 3.84E−03 | 2.31E−03 | 1.85E−03 | 6.24E+01 |
| Contact resistance in mohm | 33.0 | 6.6 | No fit | No fit | 7.5 |
| DMA 15 min at at 180° C. boxoven |  |  |  |  |  |
| (E modulus at −15° C.) | 3273 | 2708 | 301 | 87 | 3778 |
| (E modulus at 25° C.) | 972 | 1370 | 14 | 3 | 1538 |

TABLE 5

|  | Ex. 18 | Ex. 19 | Ex. 20 | Ex. 21 | Ex. 22 | Ex. 23 |
|---|---|---|---|---|---|---|
| Urethane acrylic resin | 18.57 | 18.57 | 18.57 | 18.57 | 18.57 | 18.57 |
| Isobornylacrylate | 11.79 | 11.79 | 11.79 | 11.79 | 11.79 | 11.79 |
| SR256 (2(2-ethoxyethoxy) ethyl acrylate mono functional acrylate | 3.02 | 3.02 | 3.02 | 3.02 | 3.02 | 3.02 |
| Phosphoric acid 2-hydroxy ethyl methacrylate | 1.17 | 1.17 | 1.17 | 1.17 | 1.17 | 1.17 |
| Adhesion promoter Silquest A-187 | 0.45 | 0.45 | 0.45 | 0.45 | 0.45 | 0.45 |
| SR238 difunctional acrylic monomer | 11.79 | 11.79 | 11.79 | 11.79 | 11.79 | 11.79 |
| Luperox 10 | 0.84 |  |  |  |  |  |
| Luperox 26 |  | 0.84 |  |  |  |  |
| Luperox DI |  |  | 0.84 |  |  |  |
| Luperox P |  |  |  | 0.84 |  |  |
| Trigonox 101 |  |  |  |  | 0.84 |  |
| dicumyl peroxide |  |  |  |  |  | 0.84 |
| Silver KP84X; K-1322P | 52.35 | 52.35 | 52.35 | 52.35 | 52.35 | 52.35 |
| Sum | 100 | 100 | 100 | 100 | 100 | 100 |
| VR 2 layers tape 2 W res Ohm · cm cure 100 sec hot plate @ 150° C. | 3.2E−03 | 3.9E−03 | 5.4E−04 | 3.6E−03 | 1.4E−03 | 1.9E−03 |
| VR 2 layers tape 2 W res Ohm · cm cure 10 min boxoven @ 150° C. | 9.2E−03 | 2.6E−03 | 5.8E−04 | 9.5E−04 | 4.7E−04 | 6.0E−04 |
| DSC peak temp, ° C. | 71.7 | 90.5 | 191.2 | 124.4 | 142.9 | 138.6 |

The invention claimed is:

1. An electrically conductive composition consisting of:
   a) a resin selected from the group consisting of epoxy (meth)acrylate, (poly)ester(meth)acrylate, urethane (meth)acrylate, silicone (meth)acrylate, poly(iso)butylene (meth)acrylate, (poly)isoprene (meth)acrylate, polybutylene (meth)acrylate and mixtures thereof;
   b) a combination of a monofunctional (meth)acrylate monomer and a multifunctional (meth)acrylate monomer, wherein the combined amount of the monofunctional (meth)acrylate monomer and multifunctional (meth)acrylate monomer is about 20.43 to about 65% by weight of the total weight of the composition;
   c) an electrically conductive filler in an amount of about 30 to about 60% by weight, based on the total weight of the composition;
   d) a curing agent; and,
   e) optionally, an adhesion promoter, a radical stabilizer, a rheological additive, a wetting agent, a dispersing agent, or any combination thereof, wherein the rheological additive is selected from the group consisting of a bentone, silica, fumed silica, fused silica, aluminum oxide, or any combination thereof,
   wherein the electrically conductive composition has a contact resistance of 24.5 mOhm or lower.

2. The electrically conductive composition according to claim 1, wherein said acrylic monomer further comprises at least one (meth)acrylate monomer having a (meth)acrylate functionalized phosphate ester.

3. The electrically conductive composition according to claim 1, wherein said resin is a urethane (meth)acrylate.

4. The electrically conductive composition according to claim 1, wherein said resin is present in an amount of 10 to 65% by weight of the total weight of the composition.

5. The electrically conductive composition according to claim 1, wherein said electrically conductive filler is selected from the group consisting of silver, nickel, carbon, carbon black, graphite, graphene, copper, gold, platinum, aluminium, iron, zinc, cobalt, lead, tin alloys, silver coated copper, silver coated graphite, silver coated polymers, silver coated aluminium, silver coated glass, silver coated carbon, silver coated boron nitride, silver coated aluminium oxide, silver coated aluminium hydroxide, and mixtures thereof.

6. The electrically conductive composition according to claim 1, wherein said electrically conductive filler is present in an amount of about 30 to about 55.22% by weight of the total weight of the composition.

7. The electrically conductive composition according to claim 1, wherein said curing agent is a peroxide selected from the group consisting of tert-butyl peroxy 2-ethylhexanoate, di-tert-butyl peroxide, tert-butyl peroxybenzoate, tert-butyl peroxyneodecanoate, 2,5-dimethyl-2,5(tert-butyl peroxy) hexane, dicumyl peroxide, tert-amyl-peroxyneodecanoate di(4-tert-butylcyclohexyl)peroxydicarbonate, di-sec-butyl peroxydicarbonate, diisopropyl peroxydicarbonate, di(2-ethylhexyl)peroxydicarbonate, dicetyl peroxydicarbonate, dimyristyl peroxydicarbonate) and mixtures thereof.

8. The electrically conductive composition according to claim 1, wherein said curing agent is present in an amount of 0.1 to 3% by weight of the total weight of the composition.

9. The electrically conductive composition according to claim 1, wherein said composition further comprises an adhesion promoter in an amount of 0.01 to 10% by weight of the total weight of the composition.

10. The electrically conductive composition according to claim 9, wherein said adhesion promoter is selected from the group consisting of epoxy functional silanes, (meth)acrylic functional silanes, carboxylates and mixtures thereof.

11. A cured product of the electrically conductive composition according to claim 1.

12. A photovoltaic module, comprising
a series-connected string of two or more solar cells in a shingle pattern having an electrically conductive bonding between said two or more solar cells,
wherein said electrically conductive bonding is formed with an electrically conductive composition according to claim 1.

13. The photovoltaic module according to claim 12, wherein said electrically conductive composition is applied by dispensing, jetting or printing to a solar cell.

* * * * *